June 28, 1955 — F. R. WILSON — 2,711,771
TUBE FLARING TOOL
Filed April 20, 1951 — 2 Sheets-Sheet 1

INVENTOR.
FRANK R. WILSON
BY DES JARDINS, ROBINSON & KEISER
HIS ATTORNEY

June 28, 1955
F. R. WILSON
2,711,771
TUBE FLARING TOOL
Filed April 20, 1951
2 Sheets-Sheet 2
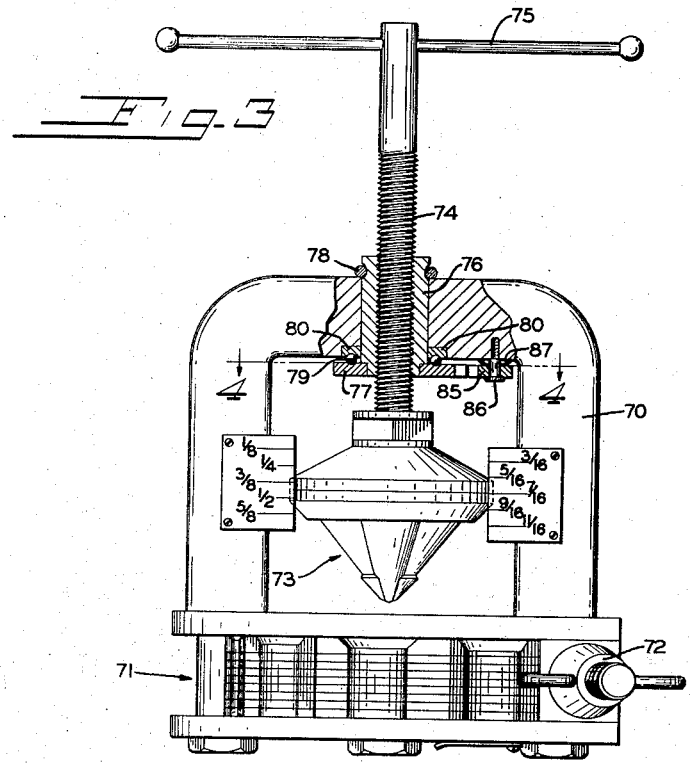
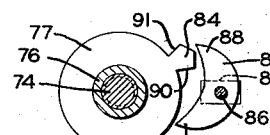
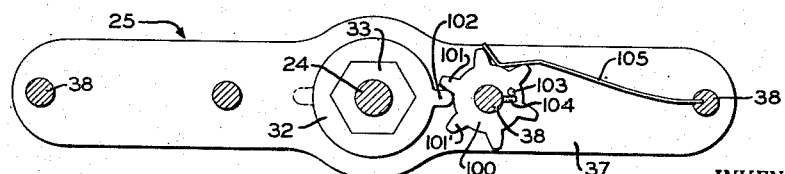
INVENTOR.
FRANK R. WILSON
BY
DES JARDINS, ROBINSON & KEISER
Howard L. Keiser
HIS ATTORNEYS

United States Patent Office 2,711,771
Patented June 28, 1955

2,711,771
TUBE FLARING TOOL

Frank R. Wilson, Lexington, Ky.

Application April 20, 1951, Serial No. 222,021

12 Claims. (Cl. 153—81)

This invention relates to a hand tool for flaring the ends of tubing, and more particularly to a flaring tool in which automatic burnishing of the flare formed on the tubing is accomplished upon reverse rotation of the handle to withdraw the cone from the tubing.

Present day practices in connection with the installation of hydraulic and fluid pressure lines which must afford the utmost in dependability and in resistance to leakage around the fittings or couplings requires that the flares provided on the ends of the tubing be accurately formed and provided with a smooth, burnished surface so as to provide a tight seal with the male element of the coupling. It is difficult to satisfy this requirement with present day hand-operated flaring tools since it is not possible with these tools to properly burnish the flare after it has been formed on the tubing. This difficulty is particularly pronounced in the case of tubing formed of a hard and non-ductile material, such as stainless steel, which is difficult to form and has heretofore required the use of power operated flaring tools in order to achieve an accurate and smoothly finished flared surface on the end of the tube.

In my copending patent application Serial No. 274,403 filed March 1, 1952, entitled Tube Flaring Tool, I have disclosed and claimed two different embodiments of a hand operated flaring tool which is capable of providing a smooth and accurate flare on the ends of tubing formed of the harder and less ductile materials, such as stainless steel, this tool being so designed as to permit burnishing of the flare after it has been formed by the flaring cone. However, in the case of the tool described in my copending application, it is necessary for the operator either to manipulate a pawl or else to remove the tube from the tool at the conclusion of the burnishing operation before the flaring cone can be withdrawn from the flared end of the tube.

In my new type of flaring tool to be hereinafter shown and described, it is no longer necessary for the operator to stop turning the handle and manipulate a pawl or remove the tube, after burnishing, before the flaring cone can be withdrawn, this being effected automatically by a novel device which I have now incorporated in the tool.

Accordingly, it is an object of this invention to provide an improved and simplified design for a hand flaring tool.

Another object of the invention is to provide a hand flaring tool in which the burnishing of the flare formed on the end of the tube is effected automatically when the handle is reversely rotated to withdraw the flaring cone from the tube and in which the cone is automatically retracted by a novel form of driving connection between the handle and the feeding mechanism.

Another object of the invention is to provide means whereby any desired number of burnishing revolutions may be obtained before the flaring cone is automatically withdrawn from the tube.

Other objects and advantages of my invention will become apparent from the following description taken in connection with the accompanying drawings, in which:

Fig. 3 is a front elevation of another form of flaring tool to which my invention may be applied, certain parts of the tool being shown in cross section so as to more clearly illustrate the invention.

Fig. 4 is a view taken along the line 4—4 in Fig. 3 showing the constructional details of the automatic burnishing control device.

Fig. 5 is a view similar to Fig. 2 but showing a different embodiment of my invention.

Figures 1, 2:
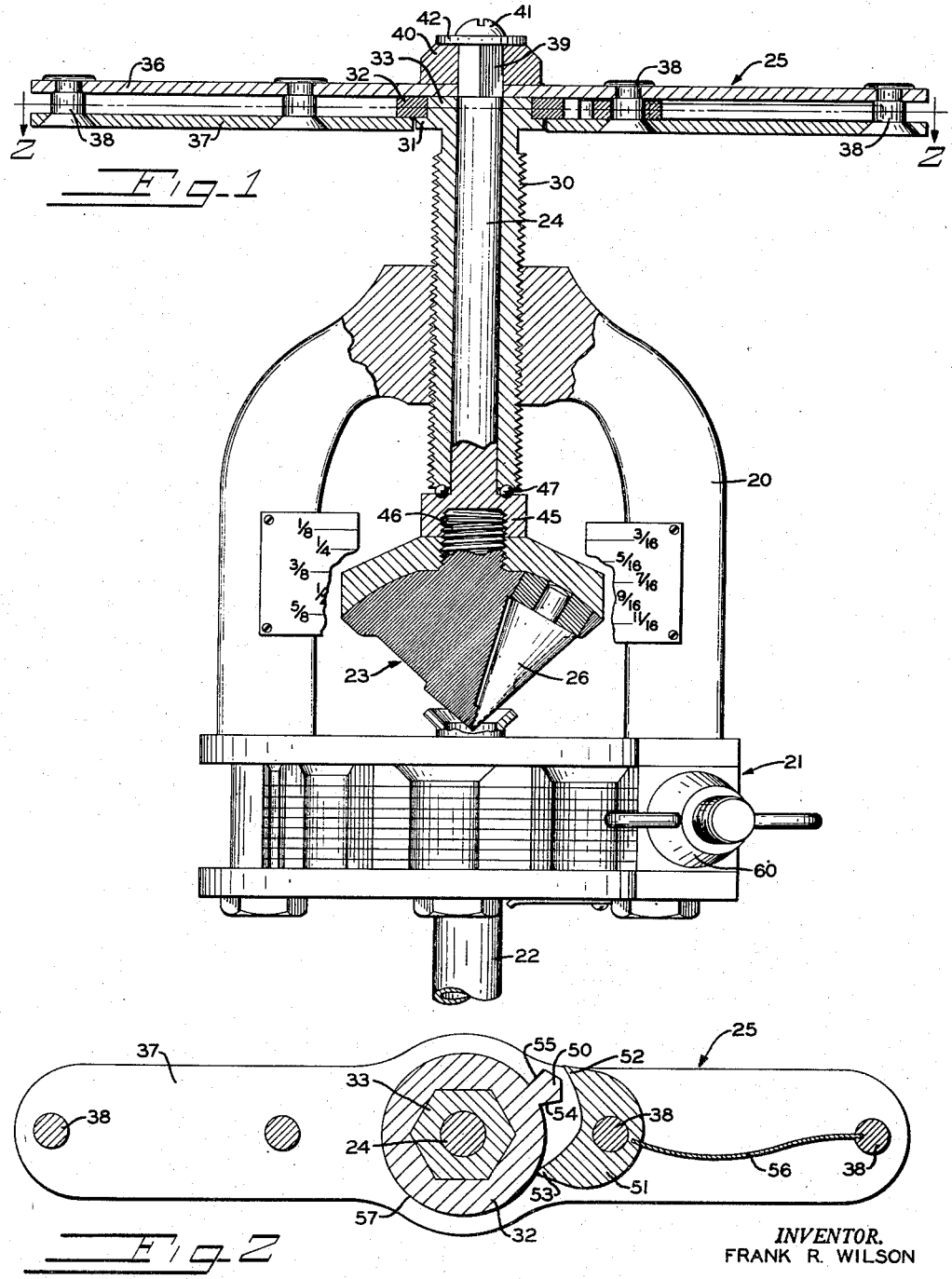
Fig. 1 is a front elevation of one type of flaring tool to which my invention may be applied, certain parts of the tool being shown in cross section so as to more clearly illustrate my invention.
Fig. 2 is a view taken along the line 2—2 in Fig. 1 showing the detailed construction of my automatic burnishing control device.

In the drawings, I have shown my invention as applied to the type of hand flaring tool shown in my co-pending application, Serial No. 274,403, above mentioned, and reference is made to this application for a disclosure of any details not found in the present description and drawings. I have also shown in the accompanying drawings several variations of my invention, it being understood, of course, that the invention is not limited to the particular detailed embodiments shown herein but may cover all modifications and alternative constructions coming within the scope of the appended claims.

As shown in Fig. 1 of the drawings, the tube flaring tool is comprised essentially of a yoke member 20 which carries a tube clamping member 21 of the type shown and described in my co-pending application, Serial No. 274,403. In this connection, I should like to point out that my present invention is not concerned with the particular type of tube clamping device utilized for holding the tubing during the flaring operation and that any suitable means for holding the tube in position beneath the flaring cone may be used in place of the clamping device shown herein.

The tool also includes a flaring cone 23 which is mounted on the lower end of a shaft member 24 to the upper end of which is attached an operating handle 25. The flaring cone shown herein is of the improved type fully shown and described in my co-pending application and includes conical rolls 26 which are adapted to roll a flare onto the end of the tube 22 and thus provide a smooth and even surface on the inside wall of the flared portion of the tube.

As shown in Fig. 1, the shaft 24 is journaled within an externally threaded sleeve member 30 which is adapted to screw into a threaded aperture provided in the yoke 20. At its upper end, the sleeve 30 has an annular flange 31 machined thereon which provides a seat upon which a disc 32 may rest. This disc has a hexagonal aperture formed therein which corresponds in size and shape with a hexagonal tenon 33 formed on the extreme upper end of the sleeve 30. Hence, when the disc 32 is placed on the tenon 33, it will be constrained to rotate in unison with the sleeve 30.

The handle 25 is comprised of two plates 36 and 37 shaped as shown in Fig. 2. These plates are secured to one another and held in spaced relationship by spacing studs 38. The lower plate 37 is provided at its center with a circular aperture of sufficient size to clear the annular shoulder 31 formed on the upper end of the sleeve 30. The upper plate 36 is provided at its center with a square opening which is adapted to fit snugly over a square section 39 formed on the extreme upper end of the shaft 24. Also fitting over the square section 39 is a beveled washer 40 welded to the plate 36 and provided with a square hole for receiving the square section 39. Hence, the handle 25 is adapted to be received on and secured to the upper end of the shaft 24 where it is held in place by a screw 41 which passes through a loose washer 42 and into a threaded hole provided in the upper end of the shaft. By virtue of this construction, the handle 25 and the shaft 24 are keyed to one another and rotation of the handle will cause concomitant rotation of the shaft.

The lower end of the shaft 24 is provided with an enlarged head 45 which has formed therein a threaded hole for receiving a threaded tenon 46 provided on the flaring cone 23. Between the lower end of the sleeve 30 and the shoulder formed by the upper end of the head 45 is an anti-friction bearing 47 which serves to take up the thrust of the flaring cone against the lower end of the sleeve 30 during tube flaring operations. The bearing illustrated in Fig. 1 is of the ball bearing type inasmuch as this sort of bearing has been found to give very satisfactory results in the tube flaring tools heretofore constructed in accordance with the teachings of the present invention. It is to be realized, however, that a different type of anti-friction thrust bearing might be used at this location so long as the type of bearing chosen is capable of absorbing the thrust produced by the cone and, at the same time, reducing the friction between the cone and the sleeve for the purpose disclosed in application Serial No. 274,403.

The burnishing control device incorporated in the tube flaring tool shown in Figs. 1 and 2 of the drawings includes a tooth 50 provided on the disc 32 and a cooperating dog 51 pivotally supported on one of the studs 38 which serve to fasten together the plates 36 and 37 of the handle. The dog 51 is a double ended member having two abutment portions 52 and 53 adapted to cooperate with re-entrant sides 54 and 55, respectively, of the tooth 50. Furthermore, the dog is controlled by a toggle spring 56 which is made in the form of a flat strip of spring steel or similar resilient material which is fastened at one end to the center of the dog and at the opposite end to the rightmost stud 38. When the dog 51 is moved past center, the spring 56 will throw the dog to an extreme position in which the abutment portion 52 or 53 will contact and ride upon the peripheral face 57 of the disc 32.

The operation of the flaring tool is as follows:

The tube 22 to be flared is inserted in the clamping device 21 and tightly secured therein by use of the wing nut 60 provided for this purpose. The handle 25 is then rotated in a clockwise direction as viewed in Fig. 2 so as to bring the abutment portion 53 of the dog into contact with the side 55 of the tooth 50. Continued rotation of the handle 25 will cause the disc 32 and thereby the sleeve 30 to be likewise rotated in a clockwise direction, thereby feeding the flaring cone downwardly toward the end of the tube 22. After the flaring cone has contacted the open end of the tube, clockwise rotation of the handle is continued until a flare of desired dimension is produced in the end of the tube. The direction of rotation of the handle is then reversed, that is, it is rotated in a counterclockwise direction as viewed in Fig. 2. The abutment 53 will now move away from the side 55 of the tooth and shortly after the handle passes the position shown in Fig. 2, the beveled upper end of the tooth 50 will wipe against the inner face of the dog in the vicinity of the abutment portion 53 and rock the dog counterclockwise. After the dog has passed dead center, the spring 56 will assist the movement of the dog so as to cause the abutment portion 52 to ride upon the peripheral face 57 of the disc 32. Continued counterclockwise movement of the handle will cause the abutment portion 52 to engage with the side 54 of the tooth, whereupon rotation of sleeve 30 will be commenced in a counterclockwise direction. This will cause the flaring cone to be removed from the tube 22 and, with continued rotation of the handle, the cone may be elevated to the desired extent above the clamping device. It will be observed from the foregoing description of the operation of the device that after the tube has been flared to the desired depth and the direction of rotation of the handle is reversed, the threaded sleeve 30 will be permitted to remain at rest from the time that the abutment portion 53 of the dog 51 leaves the tooth 50 until the abutment portion 52 engages with the opposite side of the tooth. In the present instance, this amounts to approximately one and three-quarters revolutions of the handle and, consequently, of the flaring cone. Hence, a burnished tube flare is provided in an automatic fashion and without any intervention on the part of the operator. I have provided for a burnishing stroke in excess of one revolution so that each of the conical rolls in the flaring head will traverse the entire extent of the flare provided on the tube and thereby eliminate any unevenness caused by minor irregularities existing in the rolls of the flaring cone.

It is obvious, of course, that, if desired, a second tooth 50 could be provided on the disc 32 diametrically opposite the present tooth so as to reduce the burnishing stroke to slightly less than one revolution of the cone in case this should be desired.

In connection with the automatic burnishing operation just described, it is to be noted that the anti-friction bearing 47 provided between the lower end of the sleeve 30 and the shoulder formed by the head 45 on the lower end of the spindle, acts to reduce the friction between the spindle and the sleeve so that the latter may remain at rest while the former continues to rotate. In other words, the frictional restraint upon the sleeve 30 presented by the meshing of the threads of the sleeve with the mating threads provided in the yoke 20 is greater than the frictional restraint between the spindle and the sleeve. Thus, when the handle is reversely rotated at the conclusion of the flaring operation, the sleeve will remain at rest until the abutment portion 52 strikes against the side of the tooth so as to pick up the sleeve and cause it to rotate counterclockwise with the handle to retract the flaring cone. After the flaring cone has been elevated to a sufficient extent above the clamping device, and a new tube is clamped in position ready for flaring, upon clockwise rotation of the handle, the sleeve 30 will be rotated clockwise in unison with the handle to cause feeding of the flaring cone into the tube to produce a flare thereon.

A modified form of flaring tool is shown in Figs. 3 and 4 of the drawings. As therein shown, a yoke member 70 carries a tube clamping device 71 in which the tube to be flared may be tightly clamped by means of a wing nut 72. A flaring cone 73 of the same general type as shown in Fig. 1 is secured to the lower end of a shaft member 74 which is provided at its upper end with an operating handle 75. The cross bar of the yoke 70 is apertured to provide a bearing for an internally threaded sleeve member 76 into which the shaft 74 may be screwed as illustrated.

The lower end of the sleeve 76 is machined to form a tenon thereon which is adapted to fit snugly within a hole provided in a disc 77 which may thereafter be copper brazed or otherwise rigidly secured to the sleeve 76. At its upper end, the sleeve is provided with an annular groove for receiving a retaining element 78 which may take the form of a snap-ring if desired. An anti-friction bearing 79 is provided between the disc 77 and a ball race 80 inserted in the bottom face of the cross bar of the yoke 70 so as to reduce the friction between these parts and also for taking up the upward thrust produced on the flaring cone during tube flaring operations. As in the case of the tool shown in Fig. 1, the bearing 79 is preferably of the ball bearing type although any other style of bearing which will provide the desired results may be used in its stead.

As shown in Fig. 4, the disc 77 is provided with a tooth 84 which is adapted to cooperate with a dog 85 supported for pivotal movement on a screw 86 which is screwed into a threaded hole provided in the cross bar of the yoke 70. Located between the dog and the cross bar is a bow spring 87 which is compressed between the dog and the cross bar so as to apply a frictional restraint to the dog and thereby tend to yieldably restrain the dog in either of its two moved positions. The dog 85, like the dog 51 shown in Fig. 2, is provided with abutment portions 88 and 89 which are adapted to cooperate with the re-entrant sides 90 and 91, respectively, of the tooth 84. The tip of the tooth is peaked as shown in Fig. 4 so as to move the dog off of dead center in case it should accidentally be moved to such a position during the burnishing stroke.

The operation of the flaring tool shown in Figs. 3 and 4 is as follows:

After the tube to be flared has been clamped in the clamping device 71 by means of the wing nut 72, the handle 75 is rotated in a clockwise direction and will cause the sleeve 76 and disc 77 to rotate clockwise until the abutment portion 88 of the dog 85 comes into contact with the side 90 of the tooth 84. Further rotation of the sleeve in a clockwise direction will thereby be prevented and continued rotation of the handle 75 will cause the flaring cone 73 to be fed downwardly toward the tube. Rotation of the handle 75 in a clockwise direction is continued until a flare of the desired depth is provided in the tube after which the handle is reversely rotated so as to burnish the flare and remove the cone from the tube. When the backward rotation of the handle is commenced, the sleeve 76 will rotate counterclockwise in unison with the shaft 74 by virtue of the combined action of the antifriction bearing 79 and the friction present between the threads of the shaft and those of the sleeve. Toward the end of the first revolution of the handle in a counterclockwise direction, the beveled end of the tooth 84 will wipe against the inner face of the dog 85 in the vicinity of the abutment portion 88 and rock the dog to the position shown in Fig. 4. Continued rotation of the handle will cause the sleeve to be rotated until the abutment portion 89 of the dog contacts the side 91 of the tooth. Further rotation of the sleeve will thereby be prevented and the cone will be advanced upwardly away from the tube as rotation of the handle is continued.

It will be thus seen, that during the first part of the reverse rotation of the handle the cone will be rotated without any upward feed and burnishing of the flare on the tube will result. As in the case of the device shown in Fig. 1, this burnishing operation will occur during approximately the first one and three quarters revolutions of the handle in the reverse direction. After burnishing of the flare has been accomplished, the flaring cone will automatically be fed upwardly away from the tube so as to permit removal of the tube from the tool and the insertion of the next tube to be flared. It will be noted that the end of the tooth 84 is beveled or peaked so as to provide a double camming surface on the upper end of the tooth which will be effective, in case the dog should accidentally be moved to a dead center position, to cam up the end of the dog and permit the tooth to pass beneath the dog rather than to be blocked by it. The bow spring 87 imposes a frictional restrain upon the dog and will hold it in whichever position it is moved by the tooth 84. The tooth is provided with the re-entrant sides 90 and 91 so as to provide a camming action on the abutment portion of the dog and thereby force the end of the dog into tight engagement with the tooth.

The anti-friction bearing 79 serves to reduce the friction between the sleeve and the yoke to a point where it is less than the friction between the sleeve and the shaft. Thus, the sleeve will be caused to rotate with the shaft and relative to the yoke during the burnishing operation.

In case it is desired to secure a greater number of burnishing revolutions of the cone, before it is withdrawn, than can be obtained by the constructions previously described, a device such as that shown in Figure 5 may be employed. This modified form of construction is applied to the type of flaring tool illustrated in Fig. 1 and involves the substitution of a toothed wheel 100 in place of the dog 51. As shown in Fig. 5, the wheel 100 is provided with six teeth 101 evenly spaced about its periphery. The wheel is journaled on the stud 38 as in the case of the dog 51 and is adapted to cooperate with a tooth 102 provided on the disc 32. After the desired flare has been provided on the tube and the direction of rotation of the handle is reversed, that is, it is turned in a counterclockwise direction, the tooth 102 will strike against the top side of tooth 101 as viewed in Fig. 5 and rotate the wheel 100 counterclockwise. For each revolution of the handle the wheel 100 will be turned through one tooth space. This operation will continue until near the end of the sixth revolution of the handle when a tooth 101' engages the tooth 102 at which time a pin 103 projecting upwardly from the wheel 100 will strike against the lower edge of an abutment 104 secured to and projecting outwardly from the stud 38 and prevent further rotation of the wheel 100. Hence, continued counterclockwise rotation of the handle will cause the disc 32 and the sleeve 30 to be rotated counterclockwise thereby withdrawing the flaring cone from the flare provided in the tube.

The wheel 100 is yieldably held against rotation and also is aligned in the correct position with respect to the tooth 102 by a leaf spring 105 fastened to the right-most stud 38. At its free end, the spring 105 has a V-shaped conformation which is adapted to enter between and bear against two adjacent teeth of the wheel 100.

Should it be desired to provide only three burnishing revolutions in place of six, a second tooth similar to the tooth 102 may be provided on the disc 32 as shown in dotted outline in Fig. 5. Similarly, if only two burnishing revolutions are desired in place of three or six, three such teeth may be equally spaced about the periphery of the disc 32 so that the toothed wheel 100 will be rotated through three tooth spaces for each revolution of the handle 25.

Having thus described my invention, what I claim as new and useful and desire to secure by United States Letters Patent, is:

1. A tube flaring tool comprising a hollow sleeve member having a screw thread on one cylindrical surface and being smooth on the other cylindrical surface, a yoke member having an aperture for receiving and supporting said sleeve member for rotation, the surface of said aperture conforming to the outer surface of said sleeve member, a shaft member passing through said hollow sleeve member and supported for rotation by said sleeve member, said shaft member having an outer surface thereon conforming to the inner surface of said sleeve member, one of said above-named surfaces of the aperture and shaft member having a screw threaded surface thereon meshing with the screw threaded surface on said sleeve member and the other of said surfaces being smooth and in contact with the smooth surface of said sleeve member, a clamping means supported on said yoke member for holding the tube to be flared, a flaring cone secured to one end of said shaft member, means on the other end of said shaft member for turning the same, the thrust of the cone on the work being resisted by the two members having the meshing screw threaded surfaces, an antifriction bearing for absorbing the axial thrust between the two members having the smooth contacting surfaces to enable free turning movement between said smooth contacting surfaces, and coupling means for controlling the relative turning movement between the two members having the smooth contacting surfaces to provide automatic burnishing of the flare, said means including drive means connected with one of said two members having the smooth contacting surfaces and a shiftable element connected with the other of the two members having the smooth contacting surfaces, said element being movable by said drive means relative to its associated member between a first position in which it coacts with said drive means to prevent relative turning movement between said two members having the smooth contacting surfaces when the shaft member is turned in one direction to enforce relative rotation between the two members having the meshing screw threaded surfaces and cause said cone to be fed into the tube, and a second position in which it coacts with said drive means to prevent relative turning movement between said two members having the smooth contacting surfaces after the shaft member has been turned a predetermined distance in the reverse direction to enforce relative turning movement between the two members having the meshing screw threaded surfaces and cause the cone to be retracted, relative rotation between the two members having the smooth contacting surfaces being effected during turning of the shaft member through said predetermined distance by virtue of the combined action of the antifriction bearing and the frictional restraint between the two members having the meshing screw threaded surfaces so as to cause the cone to turn without feed and effect burnishing of the flare.

2. The tube flaring tool of claim 1 wherein said shiftable element is supported for limited pivotal movement relative to its associated member.

3. The tube flaring tool of claim 1 wherein said shiftable element comprises a reversible pawl and said drive means comprises a single tooth.

4. The tube flaring tool of claim 3 including a cam face on said pawl adapted to be engaged by the tooth during the first revolution of turning movement of the shaft member in said reverse direction to reverse the position of the pawl.

5. The tube flaring tool of claim 1 wherein said shiftable element comprises a toothed wheel, and means for limiting the turning of said wheel by said tooth means.

6. A tube flaring tool comprising a yoke having an internally threaded opening therein, a tube clamping means supported on said yoke for holding the tube to be flared, a sleeve member extending through the opening and having external threads meshing with the threads in the opening, a shaft member extending through said sleeve member and rotatably journaled therein, a flaring cone secured to one end of said shaft member, means on the other end of said shaft member for turning the same, an antifriction thrust bearing interposed between said sleeve member and said shaft member to absorb the axial thrust exerted on the shaft member during tube flaring operations and to allow the shaft member to turn freely within said sleeve member, and coupling means for controlling the relative rotation between said shaft member and said sleeve member to provide automatic burnishing of the flare, said means including drive means connected with one of said members, and a shiftable element connected with the other of said members, said element being movable by said drive means relative to its associated member between a first position in which it coacts with said drive means to prevent relative rotation between said members when said shaft member is turned in one direction to cause the cone to be advanced into rotating contact with the end of the tube to flare the same, and a second position in which it coacts with said drive means to prevent relative rotation between said member after the shaft member has been rotated through a predetermined distance in the reverse direction to cause the flaring cone to be retracted, relative rotation between the sleeve member and the shaft member being effected during turning of the shaft member through said predetermined distance by virtue of the combined action of the antifriction bearing and the frictional restraint between the threads in the opening and the threads on the sleeve member so as to cause the cone to turn without feed and effect burnishing of the flare.

7. The tube flaring tool in claim 6 wherein said element comprises a reversible pawl and said drive means comprises a single tooth.

8. The tube flaring tool of claim 7 including a cam face on said pawl adapted to be engaged by said tooth during the first revolution of the shaft member in said reverse direction to reverse the position of the pawl.

9. The tube flaring tool of claim 6 wherein said element comprises a toothed wheel, and means for limiting the rotation of the wheel to a predetermined angle.

10. The tube flaring tool of claim 1 wherein said hollow sleeve member is internally threaded and is journaled for rotation in the aperture of said yoke member and said shaft member comprises an externally threaded shaft meshing with the threads in said sleeve member, and wherein said drive means is connected with one of said sleeve or yoke members and said shiftable element is connected with the other of said sleeve or yoke members to prevent relative turning movement therebetween except during turning of said shaft through said predetermined distance in the reverse direction.

11. The tube flaring tool of claim 10 wherein said element comprises a reversible pawl and said drive means comprises a single tooth.

12. The tube flaring tool of claim 11 including a cam face on said pawl adapted to be engaged by said tooth during the first revolution of said shaft in the reverse direction to reverse the position of the pawl.

References Cited in the file of this patent

UNITED STATES PATENTS

| Number | Name | Date |
| --- | --- | --- |
| 603,377 | Fitch | May 3, 1898 |
| 1,383,839 | Mueller et al. | July 5, 1921 |
| 1,383,840 | Mueller | July 5, 1921 |
| 1,765,704 | Schultis | June 24, 1930 |
| 1,795,358 | Arndt | Mar. 10, 1931 |
| 2,071,314 | Andrus | Feb. 23, 1937 |
| 2,216,482 | Wright | Oct. 1, 1940 |
| 2,268,243 | Curtis | Dec. 30, 1941 |
| 2,604,139 | Franck | July 22, 1952 |